`United States Patent` [19]

Rasberry et al.

[11] 3,826,558

[45] July 30, 1974

[54] MECHANICAL ROTARY TILT STAGE

[75] Inventors: Phillip P. Rasberry, Durham; Donald R. Whitaker, Raleigh, both of N.C.

[73] Assignee: The United States of America as represented by the Secetary of the Air Force, Washington, D.C.

[22] Filed: July 21, 1972

[21] Appl. No.: 274,030

[52] U.S. Cl. ................................. 350/90, 350/86
[51] Int. Cl. ........................................ G02b 21/26
[58] Field of Search ............ 350/90, 87, 81; 356/30, 356/31

[56] References Cited
UNITED STATES PATENTS
3,549,232  12/1970  Hugle .................................. 350/90
3,555,916  1/1971  Santy ................................ 350/86 X FOREIGN PATENTS OR APPLICATIONS
718,651  11/1954  Great Britain ....................... 356/31
370,625  3/1923  Germany ............................. 350/90
1,133,153  7/1962  Germany ............................. 356/30

Primary Examiner—David H. Rubin
Attorney, Agent, or Firm—Harry A. Herbert, Jr.; Arsen Tashjian

[57] ABSTRACT

A mechanical stage capable of tilting in any direction and rotated 360 degrees at any tilt angle includes a hemispherical support base which rests upon an O-ring bearing allowing tilt and rotary motion so that an object located at the center of the hemisphere at a point in space above the plane of the bearing can be tilted and/or rotated without shifting its position in X or Y. A rotatable plate forming the top of the hemisphere has a vacuum chuck positioned thereon for holding the object during examination.

3 Claims, 3 Drawing Figures

PATENTED JUL 30 1974 3,826,558

# MECHANICAL ROTARY TILT STAGE

BACKGROUND OF THE INVENTION

Mechanical stages are an extension of man's ability to manipulate objects, just as optics are an extension of his ability to see them. The development of optics which have the ability to greatly magnify very small objects also required the development of mechanical systems with which to precisely position the objects to be viewed. In optics related systems, many highly refined mechanical stages are available with X, Y, and Z movements to position an object. Rotation of the object is also possible in some stages. For most purposes, X, Y, and Z movements are sufficient; however, the capability to precisely tilt an object (e.g. to change illumination angle) is sometimes required. Few tilt stages are available and those available suffer from small tilt range, excessive height, or both. What is needed is a mechanical system to meet the tilt requirement with several concomitant advantages including interchangeable vacuum chucks for holding various size flat objects for inspection.

SUMMARY OF THE INVENTION

The present invention is concerned with providing a mechanical stage supporting a circular table which can be tilted in any direction, rotated 360° at any tilt angle, has convenient operator controls for tilt on the side of the stage, and will not shift laterally when tilted. An additional feature is a vacuum chuck built into the center of the table and internally ported to the side of the stage where a vacuum line can be connected.

Accordingly, it is an object of the invention to provide a mechanical rotary tilt stage which has a capability of up to ±10 degrees tilt in any direction with precision equal to that available in other designs having only a small fraction of this range of tilt.

Another object of the invention is to provide a rotary tilt stage wherein the stage is capable of 360 degrees rotation at any tilt angle.

Still another object of the invention is to provide a mechanical rotary tilt stage wherein there is no lateral shift of the center of the table surface when tilted.

A further object of the invention is to provide a rotary tilt stage wherein the operator controls are side mounted for easy access. This arrangement provides a clear table top and full X, Y movements when used on the typical microscope mechanical stage.

A still further object of the invention is to provide a rotary tilt stage which includes interchangeable vacuum chucks for holding various size flate objects for inspection.

Another still further object of the invention is to provide a mechanical rotary tilt stage of low profile configuration on the order of 1.3 inches total height for +10 degrees tilt. This configuration enhances the adaptability of the invention to most standard microscopes, as well as to many special optical applications.

These and other objects, features and advantages will become more apparent after considering the following detailed description taken in conjunction with the illustrative embodiment in the accompanying drawings wherein like reference numerals are used throughout to identify like elements.

IN THE DRAWINGS

DESCRIPTION OF A PREFERRED EMBODIMENT

Figure 1:
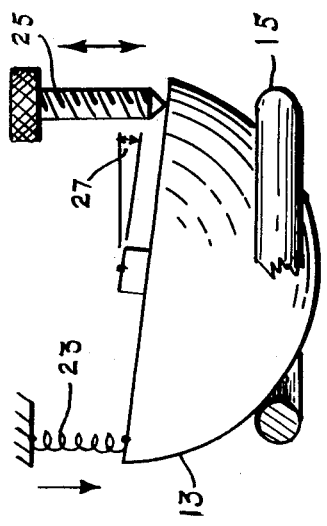
FIG. 1 is a diagrammatic view in side elevation of the principles involved in the invention including the hemisphere and O-ring bearing.

Referring now to the drawings, the movement of the rotary tilt table is basically that of a hemisphere 13 resting on an O-ring 15 approximately 40 per cent smaller in diameter (see FIG. 1). The center of the hemisphere 13 is located at the point 17 which is the center of the tilt and rotary movements. With the arrangement as shown, the O-ring 15 acts as a bearing and the hemisphere 13 can be rotated and/or tilted in any direction without changing the position of its center 17 with respect to the bearing 15. The significance of this arrangement is that the center 17 of the hemisphere's movements is a point in space above the plane of the bearing 15.

Figure 2:
FIG. 2 is a diagrammatic view in side elevation to show the operation of the tilt plus retention mechanism.

An object located at the point 17 can be tilted and/or rotated without shifting its position in X or Y. In practice, the center of tilt is at the surface of a table 19 when the object 21 is located and the bearing 15 is below the surface where it cannot interfere with the object 21. Tilt adjustments of the hemisphere 13 are accomplished by (1) exerting spring-loaded pressure downward on the edge of the hemisphere 13 by means of the springs 23 at two locations 90 degrees apart, and (2) balancing these pressures with two adjustment screws 25 also exerting downward pressure and diametrically opposed to each of the two load springs 23. As shown in FIG. 2, the downward pressures hold the hemisphere 13 in the O-ring 15, and a change in adjustments shifts the tilt angle 27 of the hemisphere 13.

Figure 3:
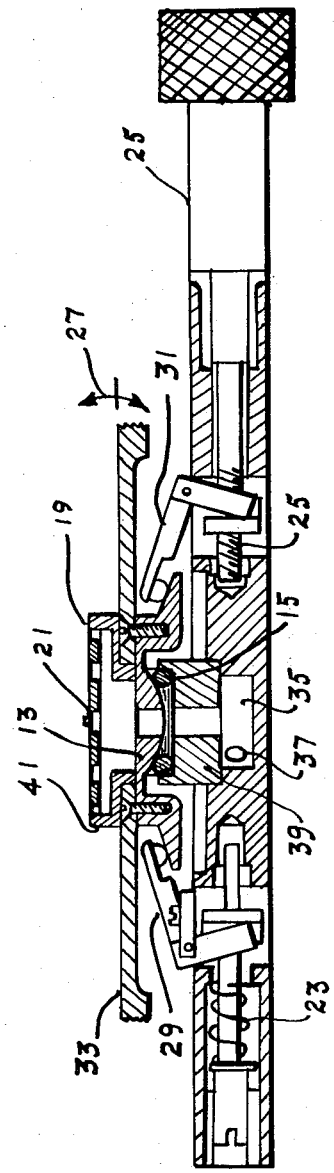
FIG. 3 is a cross-sectional view of the rotary tilt stage assembly according to the invention showing a preferred embodiment adaptable for use with a standard microscope.

In the actual design the hemisphere 13 is much modified as shown in FIG. 3. The load spring 23 and tilt adjustment screws 25 work through corresponding pivoted levers 29 and 31. An edge-knurled plate 33 located on top of the hemisphere 13 is used as a load surface and as a rotation input. A vacuum passage 35 includes the vacuum port 37 which is internally ported to the side of the stage where a vacuum line can be connected. The vacuum passage 35 extends upwardly from the base 39 through the hemisphere 13 to a vacuum chuck 41 on the top of the plate 33.

In a typical use of the invention, the rotary tilt stage would be mounted in the X, Y stage of a modified Bausch and Lomb microscope to produce a magnified image of the optical defects on the surface of an integrated circuit. This combination results in a mechanical stage with X, Y, Z, tilt and rotary capabilities. Objects 21, for example, silicon wafers containing integrated circuits, are held in position for optical inspection by the vacuum chuck 41 mounted on the plate 33. The tilt and rotary capabilities of the stage allow the operator to perform optical filter alignments within the test set which cannot be achieved by X and Y manipulations alone.

Although the invention has been described with reference to a particular embodiment, it will be understood to those skilled in the art that the invention is capable of a variety of alternative embodiments within the spirit and scope of the appended claims.

Having thus described our invention, what we desire to secure by Letters Patent of the United States is:

1. A mechanical rotary tilt stage for use on a microscope having an X, Y stage, said rotary tilt stage comprising a tiltable and rotatable hemisphere support member with flat portion upwardly oriented and spherical portion downwardly oriented, a substantially flat surfaced base member in spaced relation below said hemisphere support member, an O-ring bearing positioned between said spherical portion and said base member for supporting said hemisphere during tilting and rotation such that the center of the spherical portion is the center of tilt and rotation, screw means for tilting said hemisphere a predetermined amount, spring means for maintaining a downward pressure on said hemisphere, pivoted levers positioned between said screw and spring means and said hemisphere, said spring means being positioned diametrically opposite said screw means, means for rotating said hemisphere, and a table for placing an object thereon, said table having its upper surface common with the upper surface of said hemisphere, thereby allowing an object located on the center of said table to be tilted and rotated without shifting the X, Y position of the object relative to the optical axis of the microscope.

2. The mechanical rotary tilt stage defined in claim 1 wherein the means for rotating said hemisphere includes a plate having knurled edges, said plate being rotatable and fixedly attached to said hemisphere such that rotation of said plate produces a corresponding rotation of said hemisphere.

3. The mechanical rotary tilt stage defined in claim 2 wherein a vacuum chuck for holding an object is positioned on said plate and rotates therewith, said vacuum chuck being operatively connected to an internal vacuum port through a vacuum passage in said hemisphere.

* * * * *